(12) United States Patent
Anderson

(10) Patent No.: US 7,567,234 B2
(45) Date of Patent: Jul. 28, 2009

(54) PROGRAMMABLE OPTICAL MOUSE

(75) Inventor: Mark A. Anderson, Ft. Collins, CO (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 805 days.

(21) Appl. No.: 10/821,594

(22) Filed: Apr. 9, 2004

(65) Prior Publication Data
US 2005/0225535 A1  Oct. 13, 2005

(51) Int. Cl.
 *G09G 5/08* (2006.01)
(52) U.S. Cl. .................... 345/163; 345/156
(58) Field of Classification Search ............. 345/156, 345/158, 157, 163, 166, 172, 175; 356/28, 356/28.5, 400, 493; 715/866
See application file for complete search history.

(56) References Cited

U.S. PATENT DOCUMENTS

| | | | | |
|---|---|---|---|---|
| 4,521,772 A * | 6/1985 | Lyon | ......................... | 345/166 |
| 4,578,674 A * | 3/1986 | Baker et al. | ................. | 345/159 |
| 5,488,571 A | 1/1996 | Jacobs et al. | | |
| 5,535,147 A | 7/1996 | Jacobs et al. | | |
| 5,815,127 A | 9/1998 | Jacobs et al. | | |
| 6,344,846 B1 * | 2/2002 | Hines | ......................... | 345/166 |
| 6,822,636 B2 * | 11/2004 | Wu | ............................ | 345/156 |
| 7,126,585 B2 * | 10/2006 | Davis et al. | ................. | 345/166 |
| 7,199,783 B2 * | 4/2007 | Wenstrand et al. | .......... | 345/156 |
| 7,228,108 B2 * | 6/2007 | Ayatsuka | ...................... | 455/73 |
| 2002/0140677 A1 * | 10/2002 | Misek et al. | ................ | 345/163 |
| 2004/0080495 A1 * | 4/2004 | Jeong | ......................... | 345/166 |
| 2004/0080496 A1 * | 4/2004 | Cheon et al. | ................ | 345/166 |
| 2005/0190158 A1 * | 9/2005 | Casebolt et al. | ............. | 345/166 |

\* cited by examiner

*Primary Examiner*—Chanh Nguyen
*Assistant Examiner*—Pegeman Karimi

(57) ABSTRACT

An optical-signal receiver comprises an optical sensor operable to receive an optical signal from an optical-signal emitter communicatively coupled to an electronic system and a processor operable to implement a performance characteristic value specified by the optical signal.

19 Claims, 4 Drawing Sheets

PROGRAMMABLE OPTICAL MOUSE

BACKGROUND

In operation, a typical optical computer mouse captures a series of images of a surface on which the mouse is located, compares one image to the next image to calculate a vector value that represents the movement of the mouse, and transmits this vector to a computer, which moves a displayed cursor a corresponding distance, at a corresponding speed, and in a corresponding direction.

A wireless optical mouse typically transmits this vector to the computer via a uni-directional wireless channel. That is, over this channel, the mouse can transmit information to the computer, but the computer cannot transmit information to the mouse.

Unfortunately, because the computer typically cannot transmit information to the mouse, it is often impossible to modify the mouse's factory settings, which determine its operating characteristics. One solution that would allow the optical mouse to receive communications from the computer is to employ a wireless bi-directional channel between the computer and mouse. However, although one can implement such a bidirectional channel, it would significantly increase the complexity, cost, and power consumption of the mouse.

SUMMARY

According to an embodiment of the invention, an optical-signal receiver comprises an optical sensor operable to receive an optical signal from an optical-signal emitter communicatively coupled to an electronic system and a processor operable to implement a performance characteristic value specified by the optical signal.

DETAILED DESCRIPTION

Figure 1:
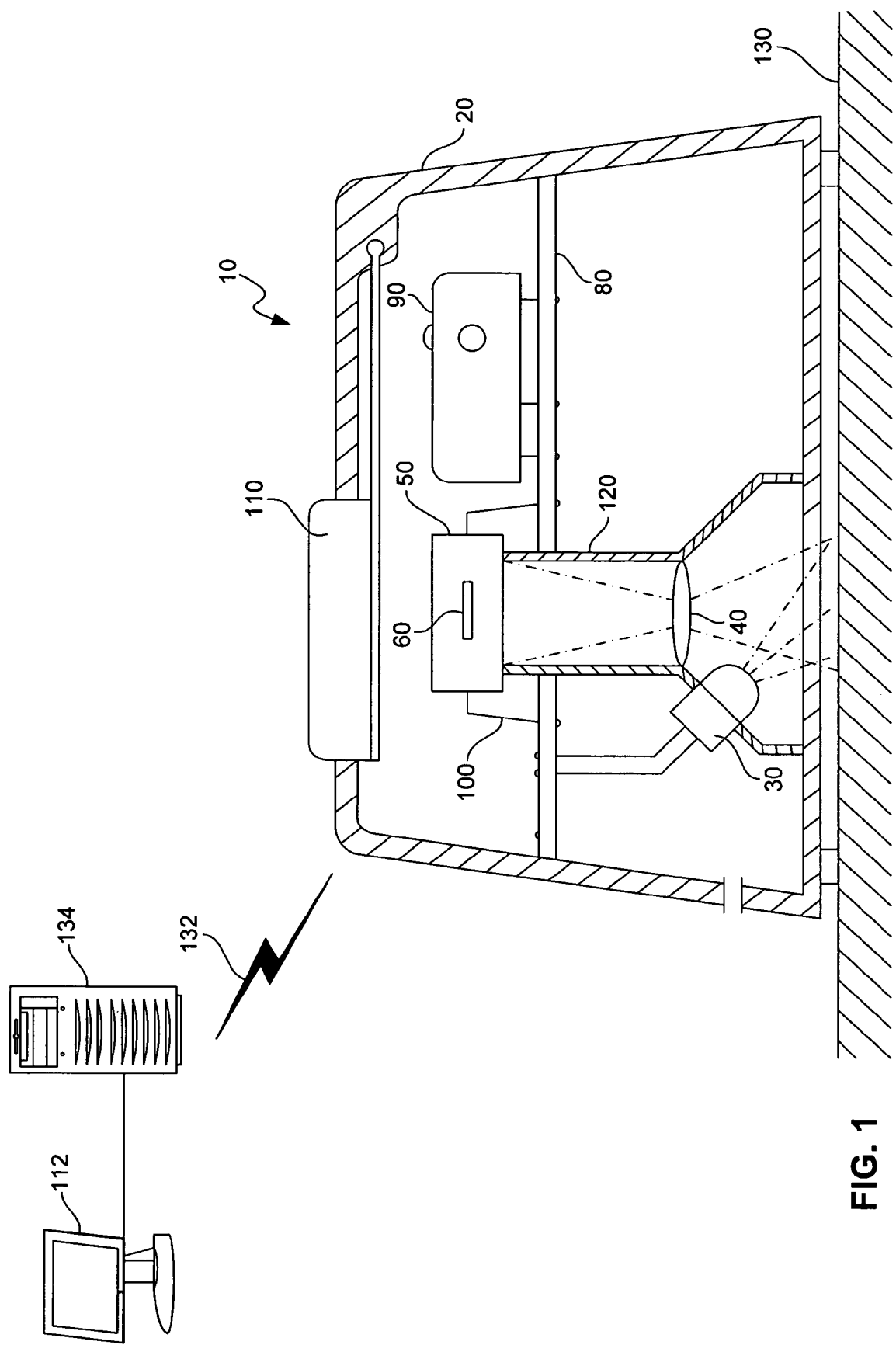
FIG. 1 is a side cutaway view of a wireless optical mouse according to an embodiment of the invention.
Figure 2:
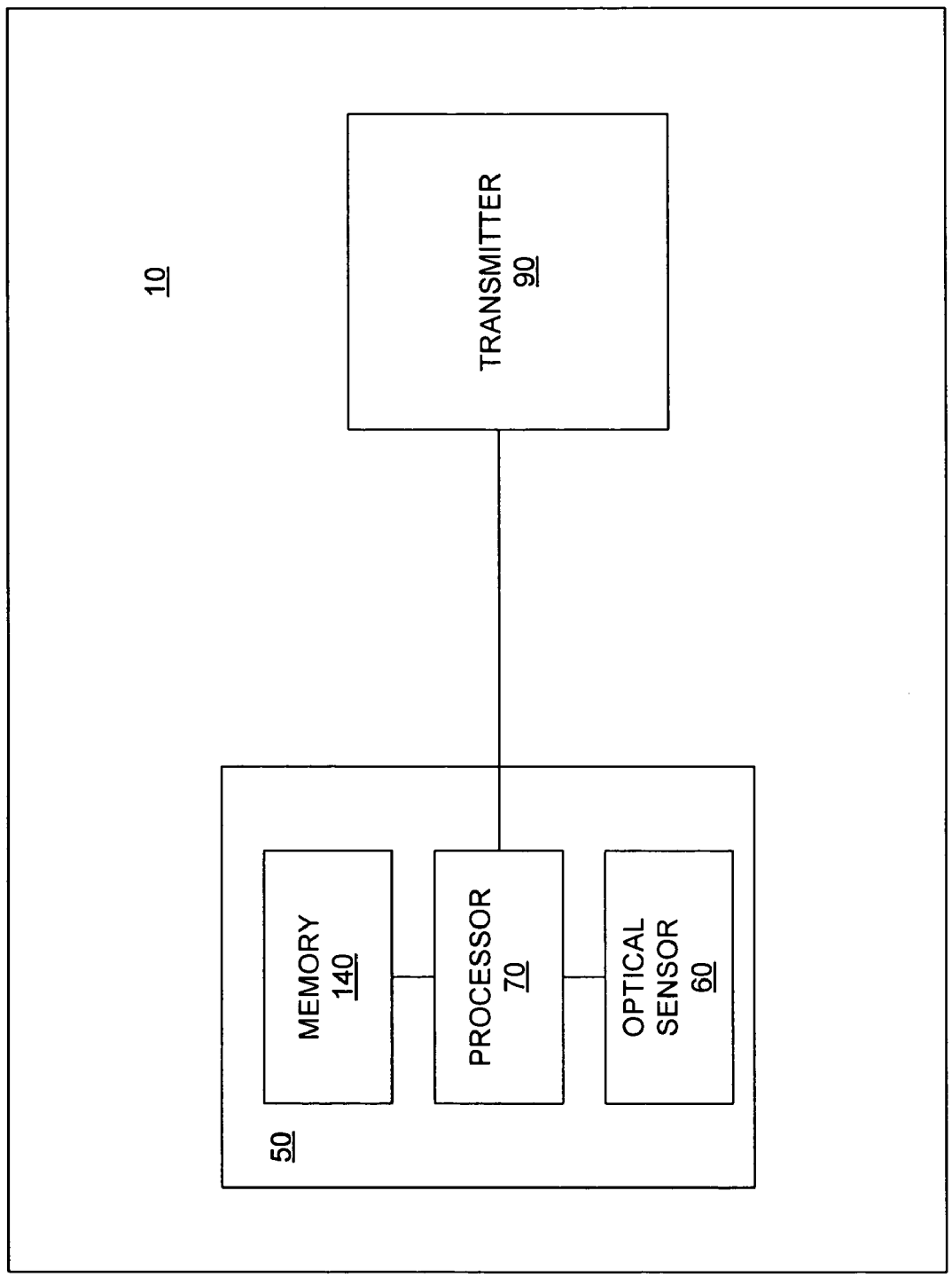
FIG. 2 is a partial schematic diagram of the circuitry within the wireless optical mouse of FIG. 1 according to an embodiment of the invention.

FIGS. 1 and 2 illustrate an optical-signal receiver, such as a wireless optical mouse 10, according to an embodiment of the invention. The optical mouse 10 includes a casing 20 in which is disposed a light-emitting unit 30 such as a light-emitting diode, a lens 40, an integrated circuit (IC) 50 having an optical sensor 60 such as a CMOS imaging array and on-board processor 70 (not shown in FIG. 1), and a printed circuit board (PCB) 80 upon which is disposed the unit 30, IC 50, and a transmitter 90. Conductive traces (not shown) on the PCB 80 enable communication between the transmitter 90 and the IC 50. A clickable button 110, which allows an operator to, for example, select items displayed on a display device 112, is mounted in an opening in an upper surface of the casing 20.

In operation according to an embodiment of the invention, the light-emitting unit 30 emits light into a chamber 120 disposed within the casing 20. The lens 40 is disposed within the chamber 120 and focuses the light reflected from a reference surface, such as a mouse pad 130, on to the optical sensor 60. The optical sensor 60 senses the reflected light, and in a manner known in the art, calculates a vector value that represents the movement of the mouse 10 relative to the pad 130. The transmitter 90 transmits the vector value to a computer system 134 coupled to the display device 112 as part of a wireless state signal 132 identifying a state of the mouse 10, which may be a radio-frequency or optical signal. In response to the received vector value, the computer 134 moves a cursor (not shown) on the display 112 a corresponding distance, at a corresponding speed, and in a corresponding direction.

FIG. 2 is a partial schematic diagram of the circuitry within the mouse 10 according to an embodiment of the invention. The IC 50, in addition to comprising the processor 70 and optical sensor 60, further comprises a non-volatile memory 140. In alternative embodiments of the invention, the processor 70, sensor 60 and/or memory may each be arranged on separate integrated circuits. The memory 140 stores settings associated with characteristics, such as a frame rate at which the sensor 60 captures images of the reference surface 130, inactivity-period threshold (i.e., the period of inactivity after which the mouse 10 enters a low-power, i.e., "sleep" mode) and other functional properties that govern the performance of the mouse.

Figure 3:
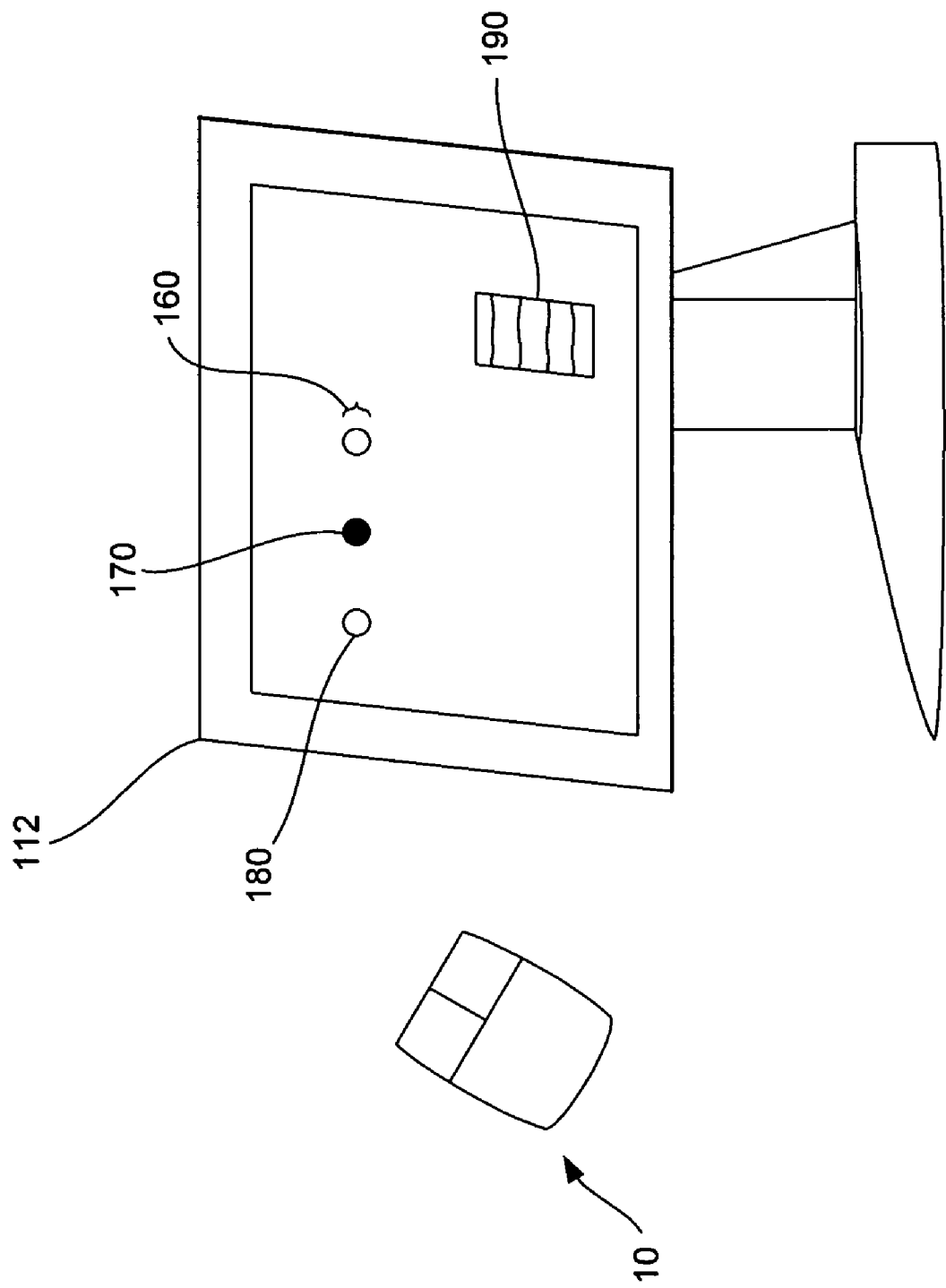
FIG. 3 is a perspective view of the mouse of FIG. 1 receiving optical programming signals from a display device in accordance with an embodiment of the invention.

Referring to FIGS. 1-3, the programming of the characteristic settings stored in the memory 140 is discussed according to an embodiment of the invention. The settings may be wirelessly altered by optical signals generated by an optical signal generator such as the computer system 134, displayed by an optical-signal emitter such as the display device 112, and received by the optical sensor 60. For example, the optical signals may represent settings data 160 in the form of a stream of pixels of varying shades of darkness displayed by the display device 112. For example, a dark pixel 170 may represent a logic 1, and a light pixel 180 may represent a logic φ, or vice versa. Alternatively, the display 112 may "flash" the settings data to the mouse 10 as a train of light pulses that form coded data. For example, two successful flashes within a predetermined time window might represent a logic 1, and one flash with in the window may represent a logic φ. Of course, other coding schemes may be used.

Still referring to FIGS. 1-3, an operator programs or reprograms the settings of the mouse 10 by holding the mouse in a predetermined position with reference to the display 112 so as to allow the optical sensor 60 to receive the data 160. As a precondition to receiving the data 160, an operator may cause the mouse 10 to enter a programming mode by, for example, depressing the button 110 for a predetermined length of time or predetermined number of times. In an alternative embodiment, the mouse 10 includes a secondary optical sensor (not shown) such as a photo diode that receives the data 160. Consequently, by generating the data 160, the computer system 134 may, via the display 112, program the setting of the mouse 10. The processor 70 is configured to demodulate/decode the data 160 received by the sensor 60 (or other dedicated sensor) and modify the performance settings stored in the memory 140 accordingly.

To select the desired settings, an operator may employ the mouse 10 to specify, via one or more dialog boxes 190 generated by the computer system 134 and displayed on the display device 112, a setting value according to which the user desires the mouse to operate. Subsequently, the computer system 134 generates on the display device 112 the data 160 that, once received and processed by the mouse 10, causes the mouse to operate according to the selected setting value. In an embodiment, the mouse 10 can provide a signal to the computer system 134 confirming that the mouse is operating according to the selected value. The computer system 134 may cause a message to be displayed by the display 112 that acknowledges this confirmation or indicates a programming error.

Figure 4:
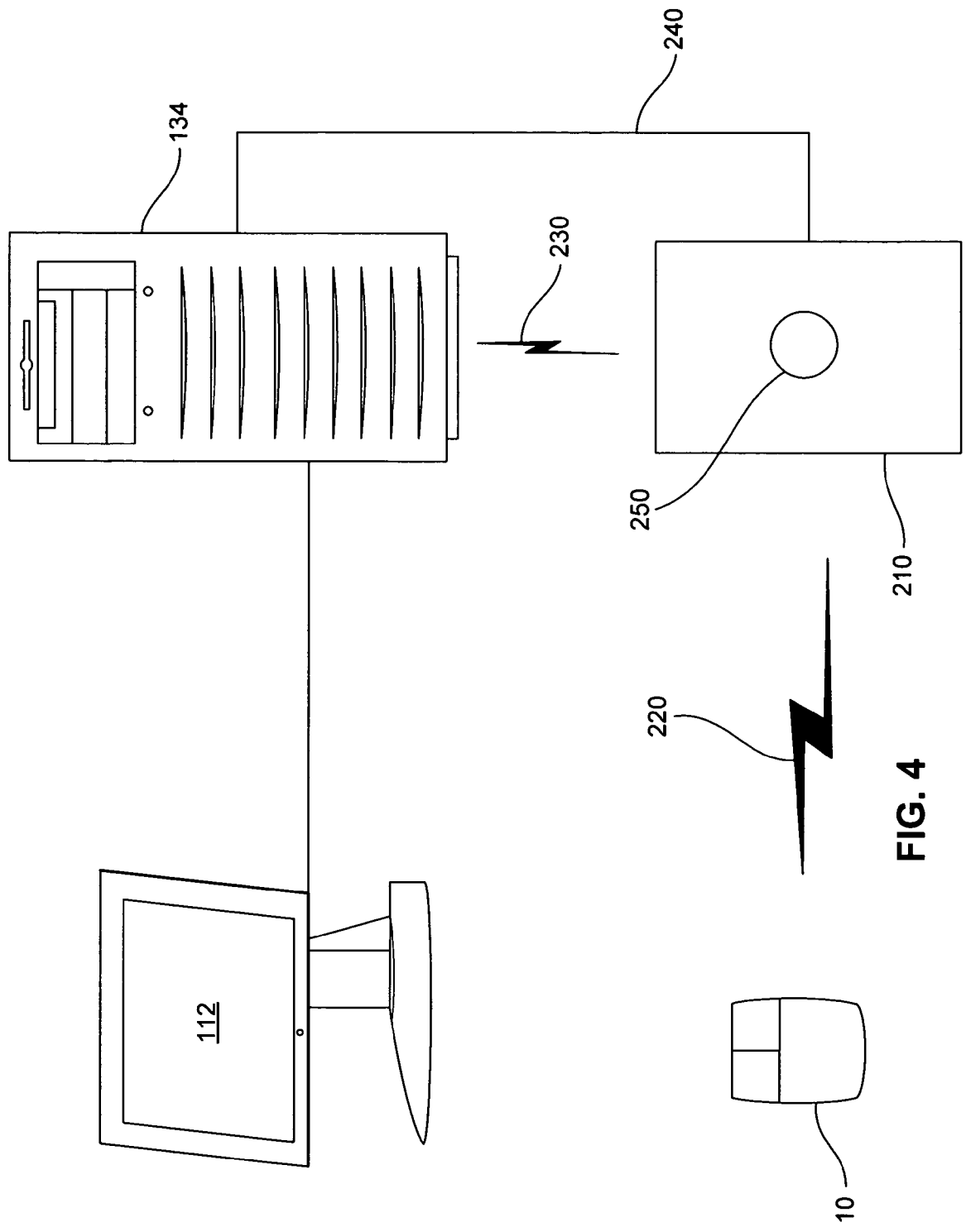
FIG. 4 is a schematic diagram of an alternative system for programming the mouse of FIG. 1 according to an embodiment of the invention.

FIG. 4 is a diagram of a system that incorporates the mouse 10 of FIG. 1 according to an embodiment of the invention. The transmitter 90 (FIG. 2) communicates the motion vector (i.e., the velocity with respect to the surface 130) of the mouse 10 to a base station 210 over a wireless channel 220. The base station 210, in turn, communicates the motion vector to the computer system 134. In alternative implementations, the base station 210 may be communicatively coupled to the computer system 134 via a wireless channel 230 or cable connection 240.

As discussed above, the mouse 10 is operable to receive from the display device 112 optical programming signals generated by the computer system 134. In an alternative embodiment, the base station 210 may comprise an emitter 250 such as a LED operable to emit optical programming signals generated by the computer system 134 that are similar to the data set 160 discussed above in conjunction with FIG. 3. The mouse 10 may mate with the station 210 so that the optical sensor 60 (FIG. 1) may receive the optical programming signals from the emitter 250.

Alternative embodiments are contemplated. For example, the mouse 10 may be programmed by optical signals from a light-emitting device (not shown) that is stand alone, i.e., is not communicatively coupled to the computer system 134 or, the mouse 10 may be manually programmable with an operator-controlled light source such as a laser pointer or flashlight.

The preceding discussion is presented to enable a person skilled in the art to make and use the invention. Various modifications to the disclosed embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. An optical-signal computer mouse, comprising:
    an optical imaging array sensor operable to capture images of a target surface, the optical imaging array sensor being further operable to receive an optical signal from an optical-signal emitter communicatively coupled to an electronic system, the optical signal specifying an operational characteristic setting of the computer mouse, the optical-signal emitter being external to the computer mouse; and
    a processor operable to calculate a vector value that represents a movement of the computer mouse using the images captured by the optical imaging array during a cursor controlling operation, the processor being further operable to implement the operational characteristic setting specified by the optical signal received by the optical imaging sensor array to program the operational characteristic setting of the computer mouse using the received optical signal "directly from a display screen" during programming of characteristic settings of the computer mouse.

2. The computer mouse of claim 1, further comprising a transmitter operable to communicate a state signal identifying a state of the computer mouse to the electronic system.

3. A system, comprising:
    an optical-signal generator;
    an optical-signal emitter coupled to the generator; and
    an optical-signal computer mouse having an original operational characteristic setting, the computer mouse including an optical imaging array sensor to receive from the emitter an optical signal that specifies an operational characteristic setting of the computer mouse and to capture images of a target surface, the optical-signal emitter being external to the computer mouse, the computer mouse further including a processor operable to calculate a vector value that represents a movement of the computer mouse using the images captured by the optical imaging array during a cursor controlling operation, the processor being further operable to set the computer mouse to the operational characteristic setting specified in the optical signal received by the optical imaging sensor array to program the operational characteristic setting of the computer mouse using the received optical signal "directly from a display screen" during programming of characteristic settings of the computer mouse.

4. The system of claim 3, wherein the generator comprises a computer system.

5. The system of claim 3, wherein the emitter comprises a video-display monitor configured to display said optical signal to be received by the optical imaging array sensor of the optical-signal computer mouse to set the operational characteristic setting to the in response to the optical signal.

6. The system of claim 3 wherein the computer mouse is operable to generate a state signal identifying a state of the computer mouse.

7. The system of claim 6 wherein the computer mouse is further operable to communicate the state signal to the generator.

8. The system of claim 6, wherein the emitter comprises a state-signal receiver operable to receive the state signal from the optical-signal computer mouse and provide the state signal to the generator.

9. The system of claim 6, wherein the state comprises velocity relative to a surface.

10. The system of claim 6, wherein:
    the state signal comprises a characteristic having first and second values; and
    the first and second state-signal characteristic values respectively correspond to the first and second performance-characteristic values.

11. The system of claim 10, wherein the optical signal specifies the second value.

12. The system of claim 10, wherein the state signal specifies the second value.

13. The system of claim 3, wherein the computer mouse is a wireless optical mouse.

14. The system of claim 3, wherein a performance associated with the characteristic is displayable by the generator.

15. The system of claim 3, wherein the operational characteristic setting comprises a frame rate.

16. The system of claim 3, wherein the operational characteristic setting comprises an inactivity-period threshold.

17. A system, comprising:
    an optical-signal emitter operable to be coupled to an electronic system; and
    an optical-signal computer mouse having an original operational characteristic setting, the computer mouse including an optical imaging array sensor to receive from the emitter an optical signal that specifies an operational characteristic setting of the computer mouse and to capture images of a target surface, the emitter being external to the computer mouse, the computer mouse further including a processor operable to calculate a vector value that represents a movement of the computer mouse using the images captured by the optical imaging array during a cursor controlling operation, the processor being further operable to set the computer mouse to the operational characteristic setting specified in the optical signal received by the optical imaging sensor array to program the operational characteristic setting of the computer mouse using the received optical signal "directly from a display screen" during programming of characteristic settings of the computer mouse.

18. A method of programming an optical-signal computer mouse, comprising:

generating an optical signal to be received by an optical imaging array sensor of the optical-signal computer mouse from an optical-signal emitter, the optical-signal emitter being external to the computer mouse, the computer mouse having an original operational characteristic setting the optical signal operable to set the computer mouse to the operational characteristic setting the optical imaging array sensor being operable to also capture images of a target surface to calculate a vector value to determine a movement of the computer mouse; and displaying the optical signal on a video-display monitor of the optical-signal emitter to be received by the optical imaging array sensor of the optical-signal computer mouse to set the computer mouse to the operational characteristic setting specified in the optical signal to program the operational characteristic setting of the computer mouse using the received optical signal "directly from a display screen".

19. A method implemented by a computer mouse having an original operational characteristic setting, comprising:

communicating a state signal identifying a state of the computer mouse to an electronic system;

receiving an optical signal from an emitter communicatively coupled to the electronic system at an optical imaging array sensor of the computer mouse, the optical signal specifying an operational characteristic setting of the computer mouse, the optical-signal emitter being external to the computer mouse, the optical signal operable to set the computer mouse to the operational characteristic setting specified in the optical signal to program the operational characteristic setting of the computer mouse using the received optical signal "directly from a display screen";

capturing images of a target surface at the optical imaging array sensor; and calculating a vector value that represents a movement of the computer mouse using the images captured by the optical imaging array.

* * * * *

UNITED STATES PATENT AND TRADEMARK OFFICE
CERTIFICATE OF CORRECTION

| | |
|---|---|
| PATENT NO. | : 7,567,234 B2 |
| APPLICATION NO. | : 10/821594 |
| DATED | : July 28, 2009 |
| INVENTOR(S) | : Mark A. Anderson |

It is certified that error appears in the above-identified patent and that said Letters Patent is hereby corrected as shown below:

Column 3, Line 62, Claim 1, delete ""directly from a display screen""
and insert --directly from a display screen--;

Column 4, Line 20, Claim 3, delete ""directly from a display screen""
and insert --directly from a display screen--;

Column 4, Lines 28-29, Claim 5, delete "operational characteristic setting to the in response to the
optical signal" and insert --performance characteristic to the second value in response to the
optical signal--;

Column 5, Line 12, Claim 17, delete ""directly from a display screen""
and insert --directly from a display screen--;

Column 5, Line 22, Claim 18, delete "setting" and insert --setting,--;

Column 5, Line 23, Claim 18, delete "setting" and insert --setting,--;

Column 6, Line 6, Claim 18, delete ""directly from a display screen""
and insert --directly from a display screen--;

Column 6, Line 21, Claim 19, delete ""directly from a display screen""
and insert --directly from a display screen--.

Signed and Sealed this
Twelfth Day of March, 2013

Teresa Stanek Rea
*Acting Director of the United States Patent and Trademark Office*